United States Patent [19]

Peyman et al.

[11] 4,312,575

[45] Jan. 26, 1982

[54] SOFT CORNEAL CONTACT LENS WITH TIGHTLY CROSS-LINKED POLYMER COATING AND METHOD OF MAKING SAME

[76] Inventors: Gholam A. Peyman, 1044 N. Oak Park Ave., Oak Park, Ill. 60302; Jeffrey E. Koziol, 249 Sunset, Palatine, Ill. 60067; Hirotsugu Yasuda, Rte. 3, Box 98, Newburg, Mo. 65550

[21] Appl. No.: 76,794

[22] Filed: Sep. 18, 1979

[51] Int. Cl.³ .......................... B05D 3/06; G02C 7/04
[52] U.S. Cl. ............................... 351/160 H; 351/177; 427/41
[58] Field of Search ............... 351/160 R, 160 H, 177; 427/41

[56] References Cited

U.S. PATENT DOCUMENTS

| | | | |
|---|---|---|---|
| 3,274,091 | 9/1966 | Amborski | 351/160 H X |
| 3,309,299 | 3/1967 | Mantell | 354/165 |
| 3,389,012 | 6/1968 | Hamm | 351/160 X |
| 3,745,042 | 7/1973 | Lim et al. | 351/160 X |
| 3,786,034 | 1/1974 | Blair et al. | 351/160 X |
| 3,808,178 | 4/1974 | Gaylord | 351/160 X |
| 3,814,051 | 6/1974 | Lewison | 351/160 H X |
| 3,925,178 | 12/1975 | Gessar et al. | 204/165 |
| 3,944,709 | 3/1976 | Levy | 428/409 |
| 4,128,318 | 12/1978 | Sieglaff et al. | 351/160 R |
| 4,143,949 | 3/1979 | Chen | 351/160 H |
| 4,208,506 | 6/1980 | Deichert et al. | 351/160 H X |
| 4,217,038 | 8/1980 | Latter et al. | 351/160 R |

OTHER PUBLICATIONS

Yasuda et al., "Ultrathin Coating by Plasma Polymerization Applied to Corneal Contact Lens," *J. Biomed. Mat. Res.*, vol. 9, 1975, pp. 629-643.

*Primary Examiner*—John K. Corbin
*Assistant Examiner*—Scott J. Sugarman
*Attorney, Agent, or Firm*—Roylance, Abrams, Berdo & Farley

[57] ABSTRACT

A soft corneal contact lens comprising a soft, highly oxygen-permeable, polymeric lens having formed on the surface thereof an ultrathin, optically clear, impermeable barrier coating. The barrier coating is tightly cross-linked and comprises the reaction product resulting from an electrical glow discharge polymerization process conducted in a gaseous atmosphere and will prevent diffusion into the lens of lipids and other large molecules from the eye's tear film. The lens is formed from silicone or polyurethane. The gaseous atmosphere consists essentially of compounds selected from the group consisting of hydrocarbons; halogenated hydrocarbons; halogenated hydrocarbons and hydrogen; hydrocarbons and a halogen; and a mixture of any two or more of these compounds. The surface of the fully formed lens is highly hydrophilic which is accomplished during the polymerization process or in an additional step comprising glow discharge in the presence of oxygen or argon.

20 Claims, 8 Drawing Figures

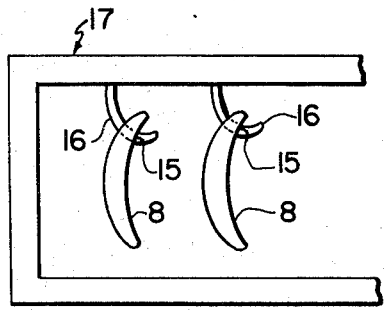
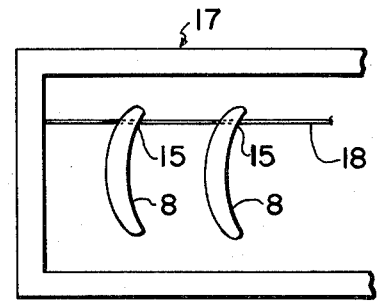
FIG. 5
FIG. 6
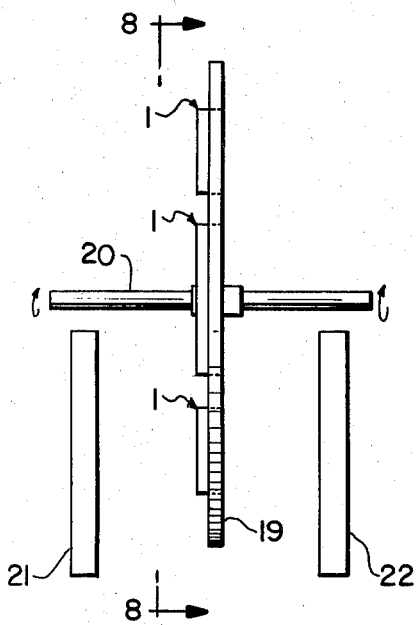
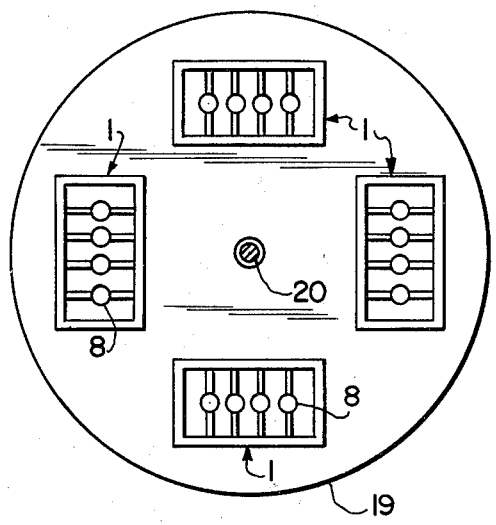
FIG. 7
FIG. 8

SOFT CORNEAL CONTACT LENS WITH TIGHTLY CROSS-LINKED POLYMER COATING AND METHOD OF MAKING SAME

FIELD OF THE INVENTION

The present invention relates to soft corneal contact lens and a method of making such lenses. The lens is formed from a polymeric core, and is coated via glow discharge polymerization with an ultrathin barrier. The core is silicone or polyurethane. The gaseous monomers used in the glow discharge can be, for example, hydrocarbons, halogenated hydrocarbons, and mixtures thereof.

PRIOR ART

Recently there has been increasing interest in developing a permanent wear corneal contact lens since there are several situations in which such a lens is greatly needed. In elderly patients, particularly after cataract surgery, contact lenses of all types cannot be placed in and taken out of the eye every day; yet, these patients lose a significant amount of vision when they are forced to wear glasses instead of a contact lens. This problem is even more important for very young children who have had a cataract removal in one eye because of trauma or congenital causes. In these cases, failure to wear a contact lens can lead to permanent loss of vision (ambylophia). Daily lens insertion and removal is performed by the parent in these cases and is nearly impossible in some children. A permanent wear lens has the advantage of not requiring daily insertion and removal. Permanent wear contact lenses are also used in many therapeutic situations such as dry eye, alkali burn to cornea, recurrent corneal erosion, herpes corneal ulcers and corneal edema. In addition, any lens that can achieve permanent wear would also be extremely well tolerated for patients who elect to insert and remove a lens each day.

Conventional hard contact lenses made of polymethyl methacrylate, which are not oxygen permeable, cannot be worn longer than 12-24 hours and have never been proposed as permanent wear lenses. Soft contact lenses are, however, currently being used for permanent wear. There are two basic classes. One class, utilizing a material such as silicone, achieves its softness because of the intrinsic nature of the material. The other class, utilizing materials such as polymers of hydroxyethylmethacrylate (HEMA) and its copolymers with other hydrophilic monomers, achieve softness by hydration of the polymer. Examples of this type are the Bausch & Lomb soft lenses and the Griffin Natural lenses. Each of these types has advantages and disadvantages and none is an ideal lens.

Silicone rubber is theoretically the ideal polymer from which to make a permanent wear soft contact lens for two reasons. First, silicone is intrinsically soft and has good optical clarity. Second, silicone has the highest gas permeability among the many polymers known today, while most polymers have a gas permeability to two orders of magnitude smaller than silicone rubber.

Silicone does however have a serious disadvantage which prevents its successful use as a contact lens. Silicone is highly permeable substances in the tear film including to lipids, lipid soluble substances, proteins, enzymes and other large molecule substances therein. When a silicone contact lens is placed on the cornea, lipids and other substances from the tear film adhere to and penetrate the lens. The optical clarity of the lens is quickly lost and the wearer's eye becomes red and irritated. Lens wear must be discontinued. Since the lipids and other substances penetrate the contact lens, they cannot be simply rubbed off and the entire lens must be replaced.

Silicone is also hydrophobic and therefore does not wet well. This leads to discomfort during wear. Although the tear film on the human cornea is a watery liquid, it is not simply either water or saline, but contains lipids, proteins, enzymes, and other large molecule substances. Changing the surface of the silicone to make it hydrophillic, for example, would not necessarily prevent the lipids and other substances in the tear film from degenerating the optical clarity of the silicone.

Currently available soft contact lenses are made of hydrophilic polymers, such as hydrogel of hydroxyethylmethacrylate (HEMA) and its copolymers with other hydrophilic monomers. The advantages of such soft contact lenses is their wearing comfort due to softness of the materials. Other alleged advantageous features, such as the claim of high oxygen permeability and a wettable hydrophilic surface, are erroneous.

High permeability of hydrogels to relatively large permeants is often attributable to the misleading concept that oxygen permeability of a hydrogel is high and that hydrogels are suitable for contact lenses because oxygen can permeate through the lens material readily.

High permeability to relatively large permeants is a consequence of a high level of water content in the material, which increases the mobility of polymer molecules. Since oxygen is relatively small in its molecular size, the transport of an oxygen molecule in a polymer does not require such a high mobility. Therefore, the increase of mobility due to the presence of water (solvent) does not affect the permeability of oxygen in a similar manner as to the larger permeants. The solubility of oxygen in water is much smaller than solubility of oxygen in many polymers. In a hydrogel, a considerable portion of the material is occupied by water molecules which have low oxygen solubility. Consequently, the net effect of high water content in a hydrogel would be evenly reduced oxygen permeability compared to that in dry polymer.

It is important to note that many manufacturers have claimed increased oxygen permeability with increased water content of soft contact lenses. They have also claimed that as the water content percentage is increased the more likely it would be that a permanent wear lens would be created. The actual effect is just the opposite since, as water content is increased, oxygen permeability decreases.

HEMA-type soft contact lenses are also claimed to be wettable and hydrophilic. The wettability of the surface of a contact lens is an obviously important advantage of a hydrogel contact lens; however, many of the hydrogel contact lenses do not have the high wettability that one would expect from their high water content. The molecules of hydrophilic polymers, such as HEMA, consist of an hydrophobic backbone and an hydrophilic substitute (pendant) moiety. Because of the hydrophilic pendant groups, a hydrogel of homopolymer of HEMA contains 45-50% volume percent of water. However, one must be cautious to judge the wettability of the surface of contact lenses made of such a hydrogel. The surface of contact lenses is an interface of air and hydrogel (containing a large amount of water). At the interface, the hydrophilic pendant groups of hydrogel would obviously prefer to face the phase which contains water, which leaves a hydrophobic portion of molecules facing towards the air phase. Because of this phenomena, the surface of a hydrogel contact lens can be considered as hydrophobic and not hydrophilic.

Among three major allegedly advantageous features of hydrogel contact lenses, i.e., softness, wettable surface, and high permeability of oxygen; only one advantage, the softness, is obtained by most of the wet-soft contact lenses.

The disadvantages of wet-soft contact lenses are also numerous. The following should be considered to compromise disadvantages of wet-soft contact lenses.

1. It is considerably more difficult to maintain a wet-soft contact lens in sterile condition than a dry contact lens.
2. The equilibrium water content of a hydrogel lens varies depending on the nature of surrounding medium.
3. The optical power of a wet-soft contact lens is also varied by the condition of the surrounding medium, consequently, it is difficult to manufacture lenses with precise optical power needed for in-situ conditions.
4. A wet-soft contact lens tends to adhere to the surface of the cornea by suction, preventing normal free exchange of tear fluid, and reducing the oxygen supply of the cornea.
5. Permeability of hydrogels to relatively large molecules which are found in the tear fluid are appreciably high because of high swollen state of hydrogel. Consequently, some lipids and lipid-soluble substances, as well as water soluble substances, penetrate into the hydrogel network and cause change in balance of hydrophilic and hydrophobic phases of the wet-soft contact lens.

In view of these problems, attempts have been made to change the hydrophobic surface of the silicone contact lenses to a hydrophilic surface. One such coating process by Dow-Corning is the use of titanate solution. This is a dipping solution and is used as a temporary coating. This has not been successful and is not currently used.

In U.S. Pat. No. 4,143,949, issued to Chen on Mar. 13, 1979, there is a disclosure of modifying the hydrophobic surface of hard or soft contact lenses by deposition of an ultrathin coating of a hydrophilic polymer under the influence of plasma glow discharge so as to integrally bind the coating to the surface of the hydrophobic lens thereby effecting a hydrophilic lens. The purpose of such hydrophilicity is to provide wettability of the lens. Each of the monomers referred to in this patent contains oxygen so that the cross-linked polymers forming the coating are not very tight. This allows lipids and other large molecules to penetrate into the core of the lens, which, if, for example is formed of silicone, becomes optically unclear.

In the article entitled "Ultrathin Coating by Plasma Polymerization Applied to Corneal Contact Lens," Yasuda et al, *J. Biomed. Mater. Res.*, Vol. 9, pp. 629–643 (1975), there is a disclosure of coating a hard contact lens by plasma polymerization in the presence of acetylene, nitrogen and water. In this technique, plasma polymerization is used to change the hydrophobic surface of the contact lens to a hydrophilic surface. This surface modification improves the wettability by water of the contact lenses and also reduces the accumulation of mucus on the surface between the lens and the cornea. However, since the plasma polymerization atmosphere includes nitrogen and oxygen, from the water, the resulting cross-linking of the polymer is not very tight, allowing lipid penetration if such coating were used with a soft lens such as silicone.

In U.S. Pat. No. 3,389,012, issued to Hamm on June 18, 1968, there is a disclosure of coating only the peripheral edge of a hard lens with a tetrafluoroethylene polymer to increase comfort to the wearer.

Thus, there still remains the need for a permanent-wear corneal contact lens which is lacking from the prior art. The hard lenses of methacrylates are low in oxygen-permeability and uncomfortable and can remain in the eye for a limited time. The soft lenses of hydrogel have numerous disadvantages and those of silicone are lipid-permeable resulting in rapid deterioration of optical clarity.

SUMMARY OF THE INVENTION

Accordingly, a main object of the present invention is to provide a permanent-wear corneal contact lens.

A further object of the present invention is to provide a corneal contact lens which is soft to provide comfort to the wearer.

A further object of the present invention is to provide a corneal contact lens which is lipid and large molecule impermeable to provide longlasting optical clarity.

A further object of the present invention is to provide a corneal contact lens which is highly oxygen-permeable and has long lasting wettability.

These objects are basically attained by providing a soft corneal contact lens comprising a soft, highly oxygen-permeable, polymeric lens having formed on the surface thereof an ultra-thin, optically clear, lipid-impermeable, highly oxygen-permeable barrier coating comprising the reaction product resulting from an electrical glow discharge polymerization process conducted in a gaseous atmosphere, said atmosphere consisting essentially of at least one compound selected from the group consisting of
(a) hydrocarbons;
(b) halogenated hydrocarbons;
(c) halogenated hydrocarbons and hydrogen;
(d) hydrocarbons and an elemental halogen; and
(e) mixtures thereof.

These objects are also basically attained by forming a soft corneal contact lens through the steps of
(a) providing a soft, highly oxygen-permeable, polymeric lens;
(b) placing the lens into an electrical glow discharge polymerization apparatus;
(c) providing a gaseous atmosphere in the apparatus, the gaseous atmosphere consisting essentially of at least one compound selected from the group consisting of
(1) hydrocarbons,
(2) halogenated hydrocarbons,
(3) halogenated hydrocarbons and hydrogen,
(4) hydrocarbons and an elemental halogen, and
(5) mixtures thereof; and
(d) subjecting the gaseous atmosphere to an electrical glow discharge under conditions sufficient to cause the compounds to form a plasma resulting in the formation of an ultrathin, lipid-impermeable, highly oxygen-permeable, optically clear barrier coating on the surface of the lens, the coating being the polymerization reaction product of the compounds and of the lens.

The resulting lens is thus coated with an ultrathin barrier which is tightly cross-linked, thereby preventing penetration of the lens by lipids and other large molecules such as proteins, enzymes and other substances present in the tear film and resulting in long lasting optical clarity.

The resulting lens is highly oxygen-permeable and has long lasting wettability so that it can be worn for a prolonged time.

Other objects, advantages and salient features of the present invention will become apparent from the following detail description, which, taken in conjunction with the annexed drawings, discloses a preferred embodiment of the present invention.

DRAWINGS

Referring to the annexed drawings which form a part of this original disclosure:

FIG. 5 is a front elevational view of another modified support system;

FIG. 6 is a front elevational view of another modified support system;

FIG. 7 is a side elevational view of a plurality of lens supports located on a disc; and FIG. 8 is a front elevational view in section taken along lines 8—8 in FIG. 7.

DETAILED DESCRIPTION OF THE INVENTION

Figure 1:
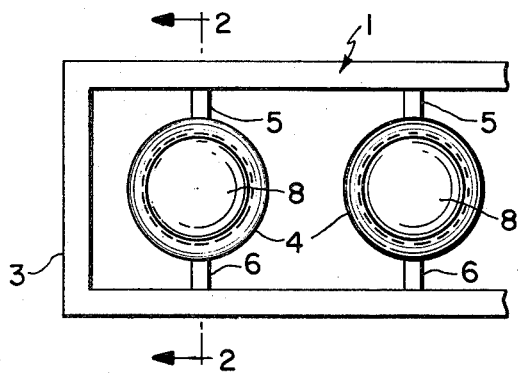
FIG. 1 is a front elevational view of a support system for supporting a plurality of lens in an electrical glow discharge apparatus.

The present invention basically comprises a soft, polymeric lens having a tightly cross-linked polymer barrier coating which is hydrophilic. This provides for lipid and large molecule impermeability and long lasting wettability, allowing permanent wear.

The polymeric lens can be formed of a silicone polymer, copolymers of silicone, polyurethane or any other soft, optically clear, highly oxygen permeable polymer material suitable for use in corneal contact lenses. Silicone polymers, copolymers or interpolymers are preferred.

The barrier coating is applied in an ultrathin thickness so that the optical clarity of the final structure is maintained and so that the lens is comfortable to the wearer. The thickness is between about 200 and about 2000 Angstroms.

Application of the barrier coating is by a process of electrical glow discharge polymerization to be described in more detail hereinafter.

During this process, the polymeric lens is exposed to a gaseous atmosphere which, upon polymerization, forms the tightly cross-linked barrier.

This gaseous atmosphere consists essentially of at least one compound selected from the group consisting of (a) hydrocarbons,
(b) halogenated hydrocarbons,
(c) halogenated hydrocarbons and hydrogen,
(d) hydrocarbons and an elemental halogen, and
(e) mixtures thereof.

Any hydrocarbon capable of polymerizing in a glow discharge apparatus may be utilized. However, as the hydrocarbon must be in a gaseous state during polymerization, it should have a boiling point below about 200° C. at one atmosphere. Additionally, the tightness, or porosity, of the barrier coating formed by the hydrocarbon is believed to be a function of the number of carbons present in the monomer. Thus, hydrocarbons with a low number of carbons are preferred. It is also preferred that the hydrocarbons be fully saturated, i.e., have no double or triple carbon-to-carbon bond, as it has been found that unsaturation leads to a somewhat looser barrier structure.

A preferred group of hydrocarbons for use in the present invention comprises those having 6 or fewer carbon atoms. Thus, methane, ethane, propane, butane, pentane, hexane, ethylene, propylene, butylene, cyclohexane, cyclohexane, benzene, pentene and acetylene comprise a preferred class of hydrocarbons for use in the present invention. A more preferred group of hydrocarbons for use in the present invention comprises saturated hydrocarbons which have 6 or fewer carbon atoms, i.e., methane, ethane, propane, butane, pentane and hexane. An even more preferred group of hydrocarbons for use in the present invention comprises those hydrocarbons which are saturated and have three or fewer carbon atoms, i.e., methane, ethane and propane. The most preferred hydrocarbon for use in the present invention is believed to be methane.

As previously indicated, halogenated hydrocarbons may also be polymerized by the process of glow discharge polymerization in order to form a barrier coating on the surface of the soft polymer lens in accordance with the present invention. Any halogenated hydrocarbon including mixed halogenated hydrocarbons, e.g., chlorotrifluoroethylene, capable of polymerizing in a glow discharge apparatus may be utilized. The halogenated hydrocarbon should have a boiling point of about less than 200° C. Thus, fully or partially fluorinated hydrocarbons; fully or partially chlorinated hydrocarbons; fully or partially brominated hydrocarbons; and fully or partially iodinated hydrocarbons may be utilized in the present invention. As with unsubstituted hydrocarbons, those halogenated hydrocarbons having low boiling points are preferred. Likewise, it is preferred that the halogenated hydrocarbon be saturated. A preferred class of halogenated hydrocarbons for use in the present invention are the fluorinated hydrocarbons. Fully fluorinated hydrocarbons, i.e., tetrafluoromethane, hexafluoroethane, tetrafluoroethylene, octafluoropropane, etc. are preferred.

When it is desired to utilize a halogenated hydrocarbon to perform the plasma polymerization process of the present invention, hydrogen gas may be added to the halogenated hydrocarbon in order to accelerate the polymerization reaction. Hydrogen may be added to the plasma polymerization apparatus in an amount ranging from about 0.1 to about 5.0 volumes of hydrogen per volume of the halogenated hydrocarbon; preferably in an amount consisting of one-half molar equivalent of hydrogen gas for each halogen atom in the halogenated hydrocarbon molecule, e.g., one-half mole of hydrogen per mole of fluoromethane, one mole of hydrogen per mole of difluoromethane, etc.

The atmosphere may also consist essentially of a hydrocarbon and an elemental halogen. Thus, elemental fluorine, chlorine, bromine or iodine may be mixed with a hydrocarbon such as methane, acetylene, ethane, ethylene, propane, propylene, butane, butene, butadiene, etc. The preferred halogen gases comprise fluorine and chlorine and preferred hydrocarbons comprise low molecular weight saturated hydrocarbons.

Mixtures of any of the above compounds may also be utilized in the present invention. Thus, a hydrocarbon, a halogenated hydrocarbon and hydrogen may be used together. A hydrocarbon, elemental halogen and hydrogen gas may be used together. Such combinations will readily suggest themselves to those of ordinary skill in the art, and it will be understood that the appended claims are intended to cover such compositions. Likewise, small amounts of accelerators or other materials which do not significantly modify the final structure of the barrier coating may be added to the atmosphere and it will be understood that the appended claims are intended to cover such combinations.

In this regard, it is important to have no nitrogen or oxygen in any form i.e., free or combined, in the atmosphere during glow discharge since this would result in a looser cross-linking, fostering lipid penetration.

It is important that the resulting lens have a highly hydrophilic surface to provide long lasting wettability. In this regard, many of the compounds selected to form the glow discharge gaseous atmosphere will provide a highly hydrophilic surface to the resulting lens. If need be, an additional step may be carried out in which the lens is exposed to oxygen or oxygen in combination with argon during glow discharge. This will provide increased hydrophilicity. In some instances, this additional step may be omitted even though, initially, the coating is not hydrophilic. It has been found that, in some cases, with the lens merely being exposed to ambient atmosphere, oxygen therein will combine with the free radicals on the lens' surface, thereby increasing the hydrophilicity of the surface.

In the method of preparing the lens of the present invention, the soft polymeric lens, or core, is shaped in the form of a contact lens of desired dimensions by any of the methods well known in the art.

This core is then placed in an electrical glow discharge reaction apparatus. The compounds to be used as the gaseous atmosphere are placed in a reservoir having an inlet to the apparatus reaction chamber. The chamber is evacuated to a pressure of about 1 millitorr to about 1 torr. The reaction chamber containing the hydrophobic lens and the compounds in vapor form at preferably from 10-50 millitorr is subjected to electromagnetic radiation thereby initiating a glow discharge resulting in ionization of the vaporized compounds and polymerization of the ionized material onto and integrally to the surface of the hydrophobic lens.

Throughout the glow discharge, the gas inlet from the reservoir is maintained in an open position to maintain a constant flow rate of the gaseous compounds in the reaction chamber as the compounds are depleted.

The frequency of the electromagnetic radiation employed can vary over a range and is determined primarily by the instruments employed. The wattage used will depend upon such factors as the surface area of the electrode, and the flow rate and pressure of the monomers utilized.

In order to support the lenses for the glow discharge operation, four different structures can be utilized.

Figure 2:
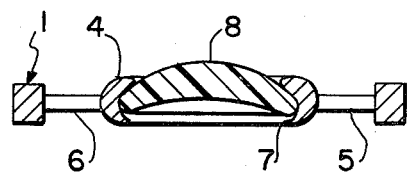
FIG. 2 is a side elevational view insection taken along lines 2—2 in FIG. 1.

The first as seen in FIGS. 1 and 2 comprises a pair of opposed, parallel support rods 1 and 2 interconnected at their ends by rods 3 to form a frame. Located between rods 1 and 2 are a plurality of annular rings 4, each ring being supported by a pair of arms 5 and 6 which are rigidly coupled, respectively, to one of the rods and to diametrically opposed points of the annular ring. As seen in FIG. 2, the interior surface of each ring 4 has an arcuate slot. The periphery of each core 8 is received in the arcuate slot, thereby supporting each core for exposure to glow discharge polymerization. Since a peripheral portion of each core is received in the slot, and therefore is not coated while thus supported, a second coating step is used in which the core is supported so that the peripheral core is exposed.

Figure 3:
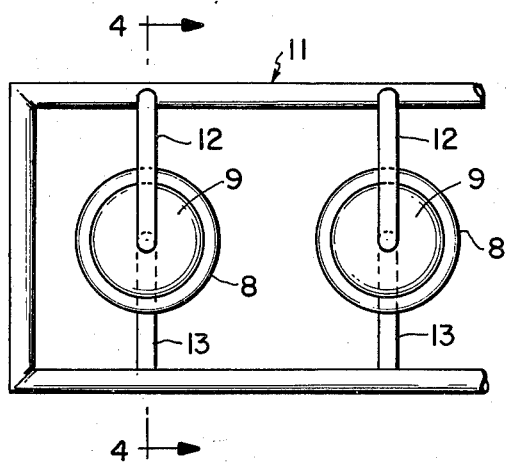
FIG. 3 is a front elevational view of a modified support system.
Figure 4:
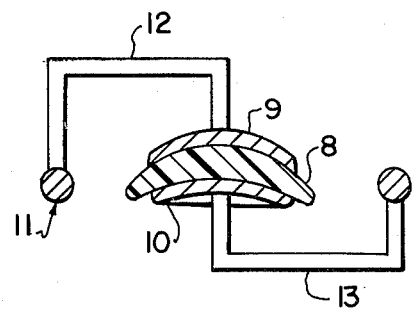
FIG. 4 is a side elevational view in section taken along lines 4—4 in FIG. 3.

This can be accomplished by using the support apparatus shown in FIGS. 3 and 4. In this case, the core 8 is supported by two opposed cups 9 and 10, which are centrally located on opposite faces of the core. Since the core has a convex side and a concave side, each cup has a corresponding shape, cup 9 receiving the convex side of the core on its concave side, and cup 10 receiving the concave side of the core on its convex side. Cup 9 is supported on rod 11 by a substantially U-shaped member 12 rigidly coupled to the cup and to the rod 11. Similarly, cup 10 is supported on a second rod 13 by a substantially U-shaped member 14 rigidly coupled to the cup and to the rod 13. The cups have an outer diameter less than the outer diameter of each core 8 so that the outer periphery of the core is exposed.

Alternately, as seen in FIG. 5, each core 8 can have a small bore 15 formed in the outer periphery for the reception of a wire hook 16, which is suitably coupled to a support frame 17.

In addition, as seen in FIG. 6, rather than a plurality of hooks, a thin wire 18 can pass through the bores 15 in a plurality of cores 8, with the wire 18 being suitably coupled to a support frame 17.

The following examples illustrate the present invention.

EXAMPLE I

Cores in the form of corneal contact lenses were prepared by conventional methods from poly(dimethylsiloxane). The cores were mounted on the supports shown in FIG. 1, which supports were received in four openings in an aluminum disc 19 as seen in FIGS. 7 and 8. The disc 19 is supported for rotation on a bar 20, with the disc passing between two opposed electrode plates 21 and 22. The assembly shown in FIG. 7 was placed in a glow discharge reaction chamber formed as a bell-jar vacuum system. The bell-jar was evacuated to the vacuum of less than $10^{-3}$ torr and then methane and and perfluoromethane (tetrafluoromethane) were introduced into the vacuum system using suitable valves. A 50% mixture of methane and perfluoromethane was established by regulating the valves. A flow rate of 5 $cm^3$ at one atmosphere per minute was maintained and a system pressure of 20 millitorr was used. After the steady state flow of the methane and perfluoromethane was established, glow discharge was initiated by a 10 kHz power source. The electrodes were equipped with magnets behind them to create a stable glow discharge under these conditions. The voltage of the power source was adjusted to maintain a constant discharge current of 300 mA. The glow discharge was continued until a thickness monitor read the predetermined thickness. After the coating was completed, the cores were mounted on the supports shown in FIG. 2, which hold the cores at the center portion leaving the peripheral edges free and the cores were subjected to a second coating process to coat the edges which were not coated by the first step due to their edges being covered. The second step is otherwise identical to the first step. Because of the HF abstraction process during this glow discharge, the resulting polymer coating contains a little amount of florine atoms and the surface was sufficiently hydrophilic to insure good wettability by the eye's tear fluid. This polymer coating had a very tight cross-link due to its graphite-like structure resulting in a lipid impermeable barrier.

EXAMPLE II

The coating was applied by the same procedures described in Example I using, however, a gas mixture of 50% tetrafluoroethylene and 50% hydrogen. The coating was further treated immediately following the deposition step by an oxygen plasma for two minutes under the same glow discharge conditions used for polymer deposition. The resulting lens had an excellent lipid impermeable barrier with a highly wettable surface.

What is claimed is:

1. A soft corneal contact lens comprising a soft, highly oxygen-permeable, polymeric lens having formed on the surface thereof an ultrathin, optically clear, lipid-permeable hydrophilic barrier coating comprising the reaction product resulting from an electrical glow discharge polymerization process conducted in a gaseous atmosphere, said atmosphere consisting essentially of at least one compound selected from the group consisting of
   (a) hydrocarbons;
   (b) halogenated hydrocarbons;
   (c) halogenated hydrocarbons and hydrogen;
   (d) hydrocarbons and an elemental halogen; and
   (e) mixtures thereof.

2. A soft corneal contact lens according to claim 1, wherein
   said polymeric lens comprises a silicone polymer.

3. A soft corneal contact lens according to claim 1, wherein
   said polymeric lens consists of a silicone polymer.

4. A soft corneal contact lens according to claim 1, wherein
   said polymeric lens comprises polyurethane.

5. A soft corneal contact lens according to claim 1, wherein
   said polymeric lens consists of polyurethane.

6. A soft corneal contact lens according to claim 1, wherein
   said compound is selected from the group consisting of methane, ethane, propane, butane, pentane, ethylene, propylene, butylene, acetylene, cyclohexane, cyclohexene, benzene and pentane.

7. A soft corneal contact lens according to claim 1, wherein
   said compounds are saturated hydrocarbons.

8. A soft corneal contact lens according to claim 7, wherein
   said compound is selected from the group consisting of methane, ethane and propane.

9. A soft corneal contact lens according to claim 8, wherein
   said hydrocarbon is methane.

10. A soft corneal contact lens according to claim 1, wherein
    said compounds are saturated halogenated hydrocarbons.

11. A soft corneal contact lens according to claim 1, wherein
    said compound is a fluorinated hydrocarbon.

12. A soft corneal contact lens according to claim 1, wherein
    said compound is a mixture of methane and tetrafluoromethane.

13. A soft corneal contact lens according to claim 1, wherein
    said compounds are tetrafluoromethane, hexafluoroethane, and tetrafluoroethylene.

14. A soft corneal contact lens according to claim 1 wherein said electrical glow discharge polymerization process is a magnetically enhanced electrical glow discharge polymerization process.

15. A method of forming a soft, optically clear, lipid-impermeable, highly oxygen-permeable hydrophilic corneal contact lens comprising the steps of
    (a) providing a soft, polymeric, oxygen-permeable lens,
    (b) placing the lens into an electrical glow discharge polymerization apparatus,
    (c) providing a gaseous atmosphere in the apparatus, the gaseous atmosphere consisting essentially of at least one compound selected from the group consisting of
       (1) hydrocarbons,
       (2) halogenated hydrocarbons,
       (3) halogenated hydrocarbons and hydrogen,
       (4) hydrocarbons and an elemental halogen, and
       (5) mixtures thereof; and
    (d) subjecting the gaseous atmosphere to an electrical glow discharge under conditions sufficient to cause the compounds to form a plasma resulting in the formation of a lipid-impermeable, highly oxygen-permeable, optically clear hydrophilic barrier coating on the surface of the lens, the coating being the polymerization reaction product of the compounds and of the lens.

16. A method according to claim 15, and further including the steps of
    introducing oxygen into the apparatus, and
    subjecting the oxygen to an electrical glow discharge under conditions sufficient to cause the oxygen to form a plasma resulting in a reaction between the oxygen plasma and the coated lens, thereby increasing the hydrophilicity of the coated lens.

17. A method according to claim 15, and further including the steps of
    introducing argon and oxygen into the apparatus, and
    subjecting the argon and oxygen to an electrical glow discharge under conditions sufficient to cause the argon and oxygen to form a plasma resulting in a reaction between the plasma and the coated lens, thereby increasing the hydrophilicity of the coated lens.

18. A method according to claim 15, wherein
    said lens comprises silicone.

19. A method according to claim 15, wherein
    said lens comprises polyurethane.

20. The process of claim 15 wherein said electrical glow discharge of step (d) is a magnetically enhanced electrical glow discharge.

* * * * *

UNITED STATES PATENT AND TRADEMARK OFFICE
CERTIFICATE OF CORRECTION

PATENT NO. : 4,312,575
DATED : Jan. 26, 1982
INVENTOR(S) : Gholam A. Peyman, Jeffrey E. Koziol, Hirotsugu Yasuda It is certified that error appears in the above–identified patent and that said Letters Patent are hereby corrected as shown below:

Claim 1, line 4, change "lipid-permeable" to --lipid-impermeable--.

Signed and Sealed this

*Twenty-ninth* Day of *June 1982*

[SEAL]

*Attest:*

*Attesting Officer*

GERALD J. MOSSINGHOFF

*Commissioner of Patents and Trademarks*